No. 784,202. PATENTED MAR. 7, 1905.
A. BERG & J. A. FRAY.
MACHINE FOR CLEANSING AND GREASING BAKING PANS.
APPLICATION FILED NOV. 29, 1904.
3 SHEETS—SHEET 1.
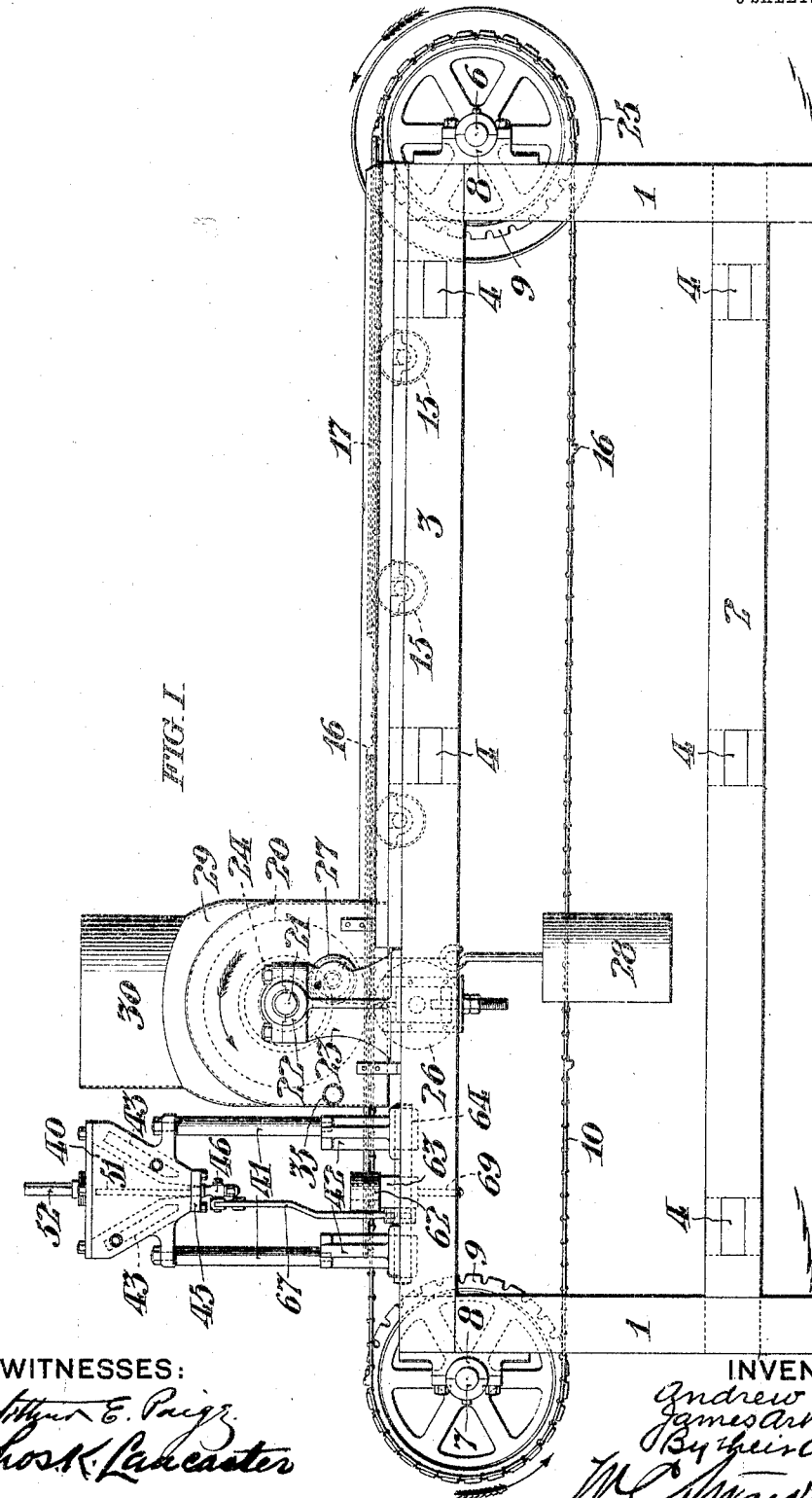

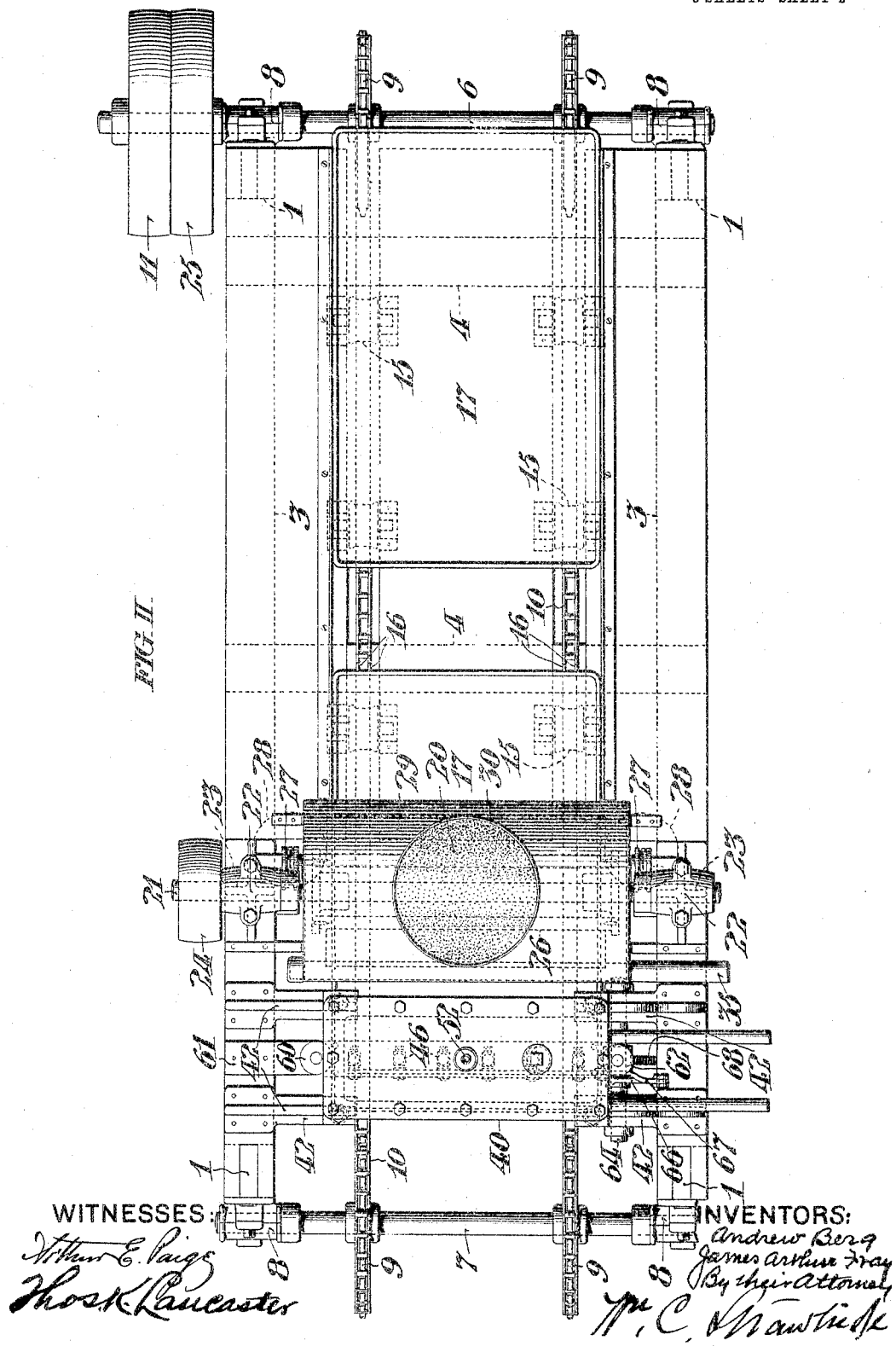

No. 784,202. PATENTED MAR. 7, 1905.
A. BERG & J. A. FRAY.
MACHINE FOR CLEANSING AND GREASING BAKING PANS.
APPLICATION FILED NOV. 29, 1904.
3 SHEETS—SHEET 3.
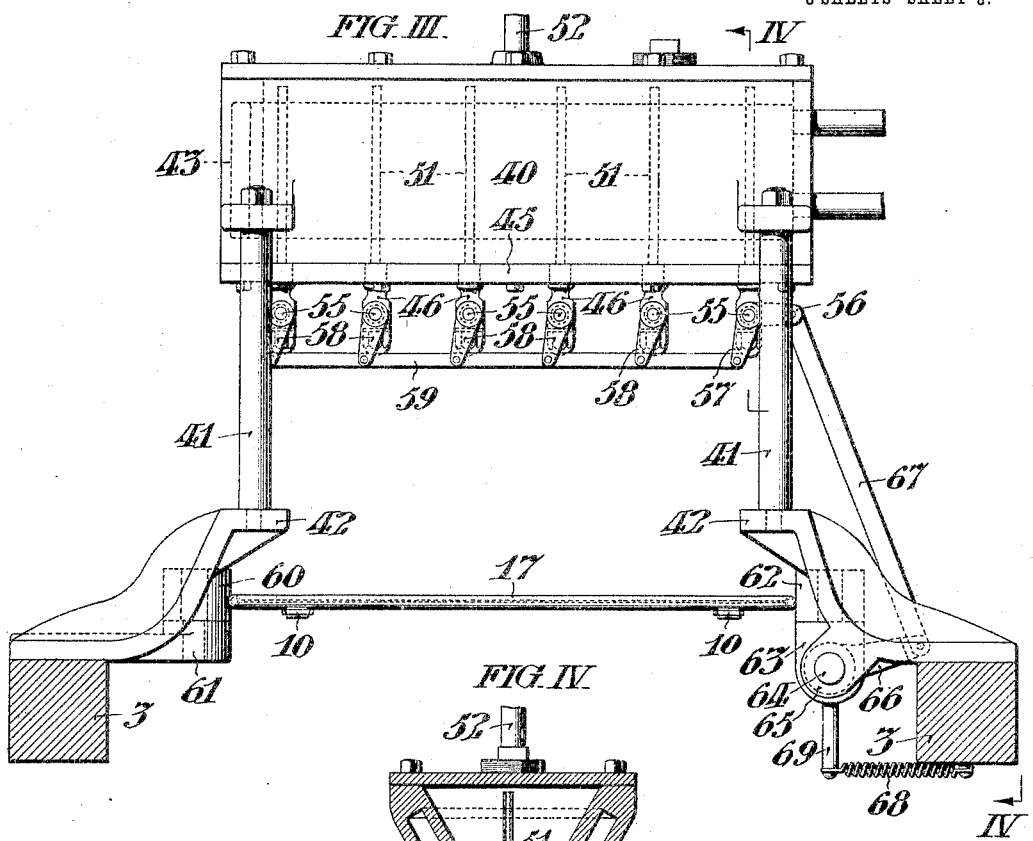
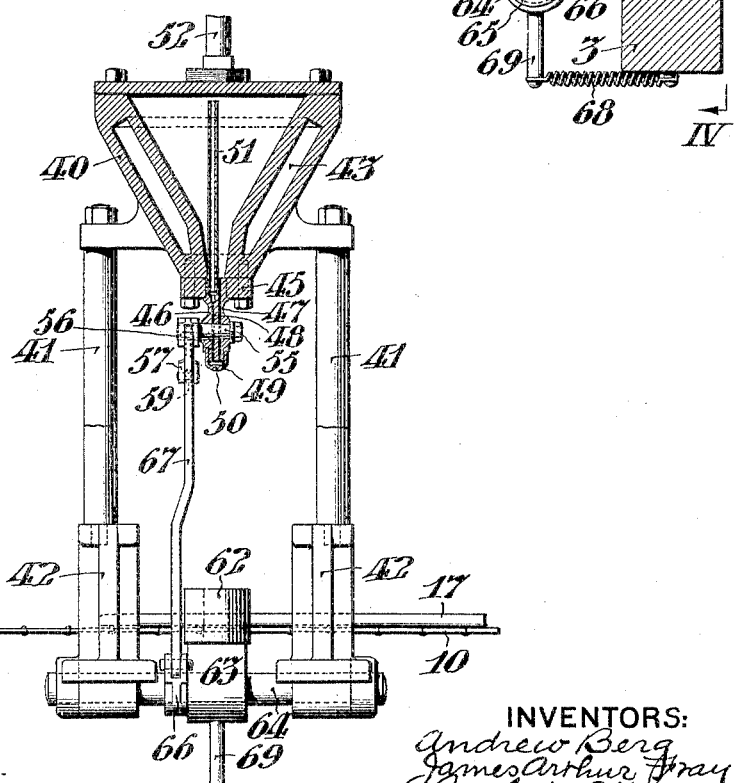
WITNESSES:
INVENTORS:
Andrew Berg
James Arthur Fray
By their Attorney No. 784,202.  Patented March 7, 1905.

UNITED STATES PATENT OFFICE.

ANDREW BERG AND JAMES ARTHUR FRAY, OF BRIDGEPORT, CONNECTICUT, ASSIGNORS TO GEORGE H. CLIFF AND CHARLES H. W. CLIFF, OF PHILADELPHIA, PENNSYLVANIA.

MACHINE FOR CLEANSING AND GREASING BAKING-PANS.

SPECIFICATION forming part of Letters Patent No. 784,202, dated March 7, 1905.

Application filed November 29, 1904. Serial No. 234,725.

*To all whom it may concern:*

Be it known that we, ANDREW BERG and JAMES ARTHUR FRAY, citizens of the United States, residing in the city of Bridgeport, county of Fairfield, State of Connecticut, have invented a new and useful Machine for Cleansing and Greasing Baking-Pans, of which the following is a specification.

Our invention relates to a machine or an apparatus for cleansing and greasing baking pans, and its object is to provide means for applying grease in a vaporized state to the baking pans.

In the construction shown, means are disclosed for conveying the baking pans through the apparatus, the said apparatus being provided with mechanism located in advance of the greasing or oiling mechanism for the purpose of cleansing and removing bread crumbs or other foreign substance from the said pans. After the pans have been cleansed, they advance to the greasing mechanism and are greased ready to be used for baking purposes.

We have illustrated a convenient embodiment of our invention, but it is to be understood that many variations and changes in the construction may be made without departing from the spirit of our invention.

In the drawings forming a part of our specification,—

Figure I is a side elevation of the machine embodying our invention;

Figure II is a top plan view of the same;

Figure III is a transverse section of a portion of the frame of the machine and of one portion of the conveyer, and also showing the greasing mechanism in side elevation; and Figure IV is a sectional view taken on the line IV—IV of Figure III.

Referring to the drawings, it will be noted that the machine is supported upon a frame consisting of the upright supports 1, horizontal side pieces 2 and 3, and cross pieces 4. 6 and 7 designate rotatable shafts respectively located at the opposite ends of the supporting frame of the machine, the said shafts being journaled in bearings 8. 9 designates sprocket wheels, two of which are mounted on each of the shafts 6 and 7.

10 designates endless carrying sprocket chains which are in engagement with the said sprocket wheels 9. 11 designates a driving band wheel secured upon one end of the shaft 6. The band wheel is driven from any suitable source (not shown) by means of a belt, and the rotation of the said wheel imparts rotation to the shaft 6, and the latter rotation is transmitted to the shaft 7 by means of the combined sprocket and carrying chains 10 which are in engagement with the sprocket wheels upon the said shafts 6 and 7.

The upper sections of the combined sprocket and carrying chains 10, intermediate the sprocket wheels over which they travel, are supported upon the small wheels 15, as is clearly shown in Figures I and II of the drawings.

The sprocket chains 10 are provided at intervals, as shown in Figures I and II, with lugs or projections 16, which are adapted to engage the rear edge of the baking pans 17 which rest upon and are carried forward by the said chains.

In their transit through the machine, the baking pans are carried through the cleansing mechanism, consisting of a rotating brush 20, constructed in any desirable manner, and of any suitable material, the said brush being mounted upon a rotatable shaft 21 journaled in bearings 22 at the upper end of upright standards or supports 23 secured to the side pieces 3 of the frame. Rotation of the cleansing brush is occasioned by means of the driving pulley 24 and a driving belt (not shown), the said belt being adapted to engage a pulley 25 on the shaft 6.

The pans are held up against the brush by means of a pressure roller 26, which is rotatably mounted at its opposite ends in movable bearings, which bearings are supported at the ends of suitable cords, the said cords passing upward over the rollers 27 and having secured at their other ends weights 28. The cleansing brush is located within the enlarged end 29 of an exhaust pipe 30, the means for exhausting the air not being shown.

As the pans travel toward the left through the machine, as indicated in Figure I, the cleansing brush 20 rotates in the direction indicated by the arrow in Figure I, in consequence of which the bread crumbs and other foreign substance upon the pans are loosened and disengaged therefrom and are drawn outward through the exhaust pipe 30. In order to still further facilitate the cleansing of the pans, we have provided a pipe 35, which is in communication with a source (not shown) of air under pressure, and by means of which a strong blast of air can be directed against the said pans through small openings in the said pipe.

The mechanism thus far described is not novel with us, and we do not claim the same separately. Our invention relates specifically to improvements in the mechanism for greasing the pans, and the combination of the same with the other parts of the apparatus. The greasing mechanism comprises a grease-holding receptacle 40, supported upon posts 41, which are in turn supported upon brackets 42 provided on opposite sides of the apparatus. The receptacle extends transversely of the length of the machine and is of a length substantially equal to the width of the pans to be greased.

The grease or oil receptacle is provided with hollow spaces 43 in its side and end walls, which are adapted to receive steam or a similar heated substance (from a source not shown), the purpose being to keep the oil in a fluid or liquid condition. It will be understood that if the receptacle is allowed to become cold, the oil or grease becomes more or less firm and immobile and will not operate in the manner desired.

The lower side of the receptacle 40 is closed by means of the strip 45 extending from end to end of the receptacle, and the said strip is provided with the plugs 46 at intervals, the said plugs respectively being provided with perforations or passageways 47 and 48, to permit the escape of the grease or oil in a vaporized state. These plugs may be designated as vaporizing nozzles.

49 designates caps which have screw-threaded connection with the lower end of the plugs 46. The ends of the said plugs do not extend entirely to the bottom of the said caps, in consequence of which there is more or less space left in the caps between the bottom thereof and the lower ends of the plugs. The lower end of each of the caps is provided with a perforation 50 for the escape of the oil or grease from the receptacle 40.

The perforations 47 are in communication with the bottom portion of the receptacle and the oil or grease passes from the said receptacle through the said perforations. The upper end of the perforations 48 is closed by means of a tube or pipe 51 which extends upwardly through the oil to a point somewhat above the upper level of the oil in the receptacle, as is clearly indicated in Figures III and IV of the drawings.

52 designates a pipe or tube communicating through the top of the grease or oil receptacle with the interior of the said receptacle for the purpose of conveying to said interior air or other suitable gaseous substance under pressure from a source of supply not shown.

It will be understood that the oil or grease should be permitted to escape from the receptacle 40 only when a pan is underneath the same.

In order to prevent the passage of oil or grease from the receptacle through the perforations 47 in the plugs 46, we have provided valves 55 for the purpose of closing and opening the said perforations 47. These valves also close and open the perforations 48. These valves extend through the plugs 46 and are provided with perforations (shown in Figure IV) which are adapted to be moved into and out of alinement with the perforations 47 and 48 in the plugs 46.

The first valve of the series, as shown in Figure III, is provided with a bell crank lever, one arm 56 of which extends or lies in a substantially horizontal position, while the other arm 57 extends downwardly. The remaining valves of the series are provided with levers 58. The levers 58 and the lever 57 are all connected at their lower ends to a rod or bar 59 extending across the machine, as clearly shown in Figure III.

When a pan is underneath the grease or oil receptacle and the valves 55 are open, the levers 57 and 58 occupy a position somewhat to one side of vertical lines or planes through the respective valves, but when in their normal position, the said levers occupy substantially vertical lines or planes.

When the valves 55 are in open position, the oil or grease escapes through the perforations 47 in the plugs 46, the amount of the flow of oil or grease being increased by the pressure of air or other gaseous fluid on the top of the said oil or grease. The air also escapes through the pipes 51 and the perforations 48, and becomes mingled with the oil in the spaces between the bottoms of the caps and the lower ends of the plugs 46. The opening and the closing of the valves is effected automatically by the passage of the pans through the machine. As the pans pass through the machine the opposite edges thereof engage upon one side of the rotatable wheel 60 mounted upon a stationary bracket 61. The other sides of the said pans engage a rotatable wheel 62 mounted upon an arm or lever 63 carried upon and rigidly secured to a rotatable shaft 64 journaled in bearings 65 in the brackets 42. The brackets 61 and 42 are illustrated as being secured to and supported upon the side pieces 3 of the frame of the machine or apparatus, but obviously they may be supported in any other suitable manner.

66 designates an arm or lever also secured to the shaft 64, and in connection with the arm or lever 63 constitutes a bell crank lever. 67 designates a link connecting the outer end of the lever 66 with the outer end of the arm 56 of the bell crank lever secured to the first of the series of valves 55.

In order to hold the arm 63, lever 66, and the parts connected to the latter, in position to close the valves 55 when there is no pan in engagement with the contact roller 62, we have provided the coiled contractile spring 68 which is connected at one end to the frame of the machine and at its other end to one end of a projecting pin 69, the other end of which is connected to the arm 63.

The projecting pin 69, however, may be connected to the shaft 64 at any other convenient and suitable point. When a pan is passing through the machine and is in contact with the rollers 60 and 62, the latter is moved outwardly against the pressure or tension of the spring 68 to open the valve, and as soon as the pan escapes from the machine, the said contact roller 62, the arm 66 and the parts connected thereto return under the influence of the said spring to their normal position to close the valves and stop further flow or escape of the oil from the receptacle.

We are aware of the application of George H. Cliff and Charles H. W. Cliff, filed February 20, 1904, serial number 194,472, for patent for a machine for cleansing and greasing baking pans, but we do not lay claim to any part of the subject-matter of the said application.

Our invention consists of an improvement in the means for applying grease or oil to the baking pans, and we hereby disclaim the broad subject-matter disclosed and claimed in the aforesaid application of George H. and Charles H. W. Cliff.

Having thus described our invention, we claim—

1. A machine or apparatus of the character described, comprising means for conveying baking or other pans through the same, and mechanism for occasioning the discharge of oil or grease upon the said pans in a vaporized state.

2. A machine or apparatus of the character described, comprising a conveyer for conveying baking or other pans through the said machine, a movable lever with which the said pans are adapted to contact as they travel through the said machine, a grease or oil receptacle, and means for occasioning the discharge of the said grease or oil upon the said pans in the form of a vapor, the operation of the said means being occasioned by the movement of the said lever.

3. A machine or apparatus of the character described, comprising a conveyer for conveying baking or other pans through the said machine, a movable lever with which the said pans are adapted to contact as they travel through the machine, a device for occasioning the discharge of grease or oil in a vaporized state upon said pans, the said device comprising an oil or grease chamber, vaporizing nozzles communicating with the said chamber, valves for closing and opening the said nozzles, and means interposed between the said valves and the said lever to occasion movement of the said valves to open and close the said nozzles.

4. A machine or apparatus of the character described, comprising a conveyer for conveying baking or other pans through the said machine, a movable bell crank lever with which said pans are adapted to contact as they travel through the machine, a device for occasioning the discharge of the grease or oil in a vaporized state upon the said pans, the said device comprising a grease or oil receptacle, a plurality of plugs extending through the bottom of the said receptacle, and the said plugs having perforations which communicate with the said receptacle, valves for closing and opening the said perforations, each of the said valves being provided with an arm or lever which is secured thereto, a rod or bar connected to each of the said levers, and one of the said valves being provided with a second arm or lever, a link connected at one end to the last mentioned arm or lever and at its other end to one of the arms of the said bellcrank lever, the movement of the latter being occasioned by the passage of the pans through the machine or apparatus.

5. A machine or apparatus of the character described, comprising a conveyer for conveying baking or other pans through the said machine, means for discharging grease or oil in a vaporized state upon said pans, the said means comprising a grease or oil chamber which is provided with a plurality of vaporizing nozzles, the said nozzles being provided with perforations, pipes communicating with one of said perforations and extending upwardly through the grease or oil and communicating with a portion of the chamber above the level of the said grease or oil, means for conveying air under pressure to the interior of the said chamber, valves for closing said perforations in said vaporizing nozzles, and means for opening and closing said valves, the operation of the said means being controlled by the pans as they pass through the said machine.

6. A machine or apparatus of the character described, comprising a conveyer for conveying baking or other pans through the said machine, means for discharging grease or oil in a vaporized state upon said pans, the said means comprising a grease or oil chamber which is provided with a plurality of vaporizing nozzles, each of the said nozzles being provided with a plurality of perforations, pipes communicating with one set or series of the perforations in the said nozzles, the said pipes extending upwardly through the grease or oil and communicating with a portion of the chamber above the level of the said grease or oil, means for conveying air under pressure to the interior of the said chamber, valves for closing the perforations through the vaporizing nozzles, a bell crank lever upon the frame of the machine, one of the arms of which is adapted to contact with the pans as they travel through the machine, and connecting means between the other arm of the said lever and the said valves whereby movement of the said bell crank lever occasions movement of the said valve to open and close the perforations in the vaporizing nozzles.

7. In a machine of the character described, in combination, a rotatable shaft, a lever rigidly secured to the said shaft, means for holding the said lever in position to engage the edge of the baking pans as they pass through the said machine, a second lever secured to the said shaft at an angle to the first named lever, a grease or oil receptacle, plugs provided in the bottom of the said receptacle, and each of the said plugs having perforations extending therethrough, valves for opening and closing the said perforations, arms connected to the said valves, a rod connecting the said arms together, a second arm connected to one of the said valves, and a link connecting the last mentioned arm with the second lever above named.

8. In a machine or apparatus for cleansing and greasing baking pans, in combination, a rotatable shaft, a lever rigidly secured to the said shaft, a projecting rod secured upon said lever, a coiled spring connected to the said rod and to the frame of the machine for holding the said lever in position to be engaged by the baking pans as they pass through the said machine, a second lever secured to the said rod at an angle to the first named lever, a grease or oil receptacle, plugs provided in the bottom of the said receptacle, each of the said plugs being provided with perforations, pipes secured in the ends of one set or series of the said perforations, the said pipes extending up through the oil to points above its upper level, valves for opening and closing the said perforations, the said valves being provided with arms, a rod connecting the said arms, and one of the said valves being provided with a second arm, and a link connecting the last mentioned arm and the second lever above named.

9. In a machine for cleansing and greasing baking pans, in combination, a grease or oil containing receptacle provided with plugs arranged in one wall thereof, each plug being provided with perforations, a series of pipes secured in one set or series of the perforations in the said plugs, the said pipes extending upwardly through the grease or oil in the receptacle to a point above its level, the said pipes being adapted to conduct air from the top of the said receptacle into and through the said perforations, caps secured upon the lower ends of the said plugs, each of the said caps being perforated, and each of the said caps inclosing a small space opposite the ends of the said plugs, valves for closing the said perforations, and mechanism for opening and closing the said valves, the operation of the said mechanism being controlled by the pans as they pass through the said machine.

In testimony that we claim the foregoing as our invention we have hereunto signed our names this 23d day of November, A. D. 1904.

ANDREW BERG.
  JAMES ARTHUR FRAY.

In presence of—
 R. J. WITTERWELL,
 HOWARD F. NETTLETON.